July 30, 1957 C. B. LETTERMAN 2,800,989
CARRIAGE SHOCK ABSORBING DEVICE
Filed Sept. 9, 1955 2 Sheets-Sheet 1
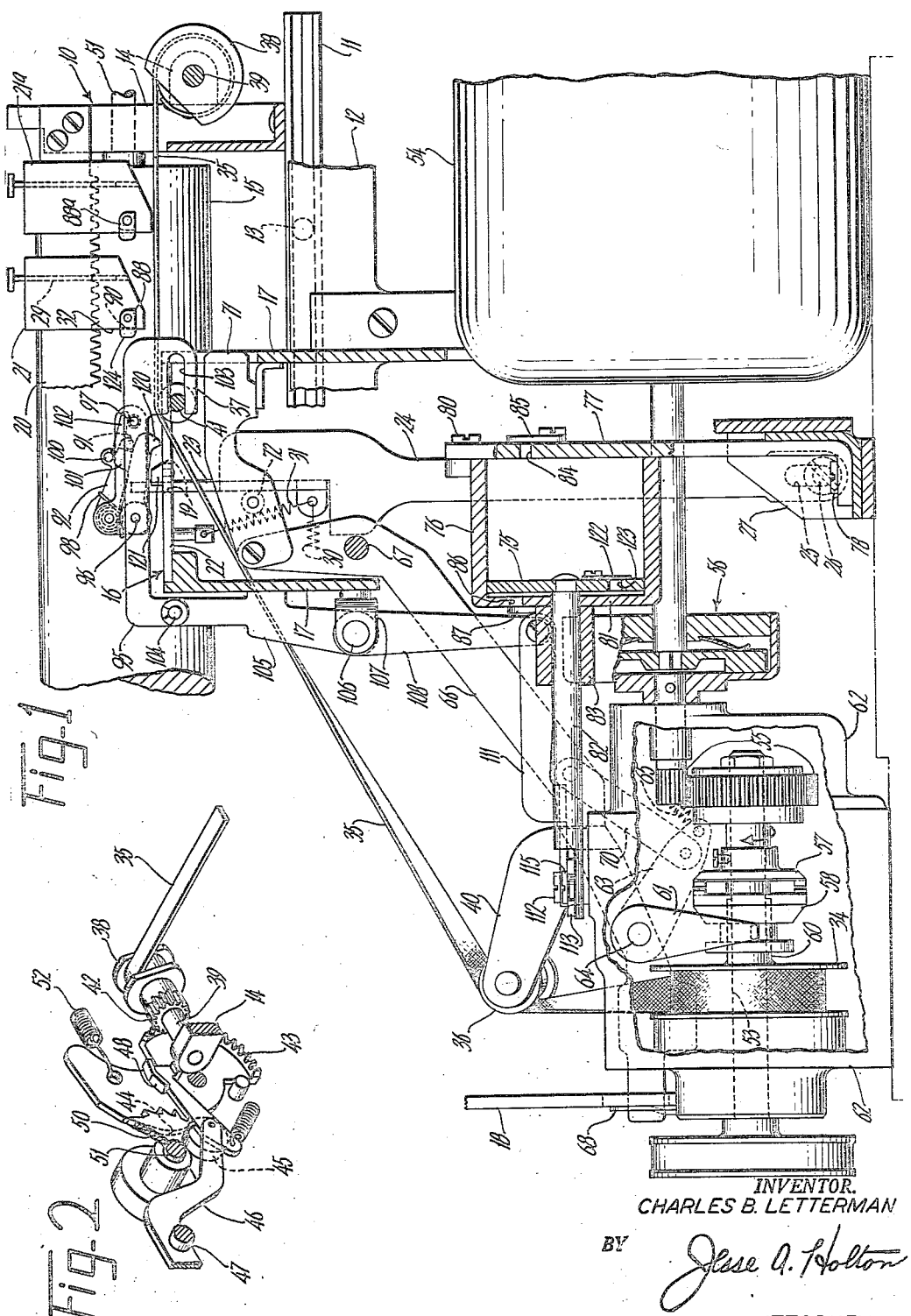
INVENTOR.
CHARLES B. LETTERMAN
BY
Jesse A. Holton
ATTORNEY

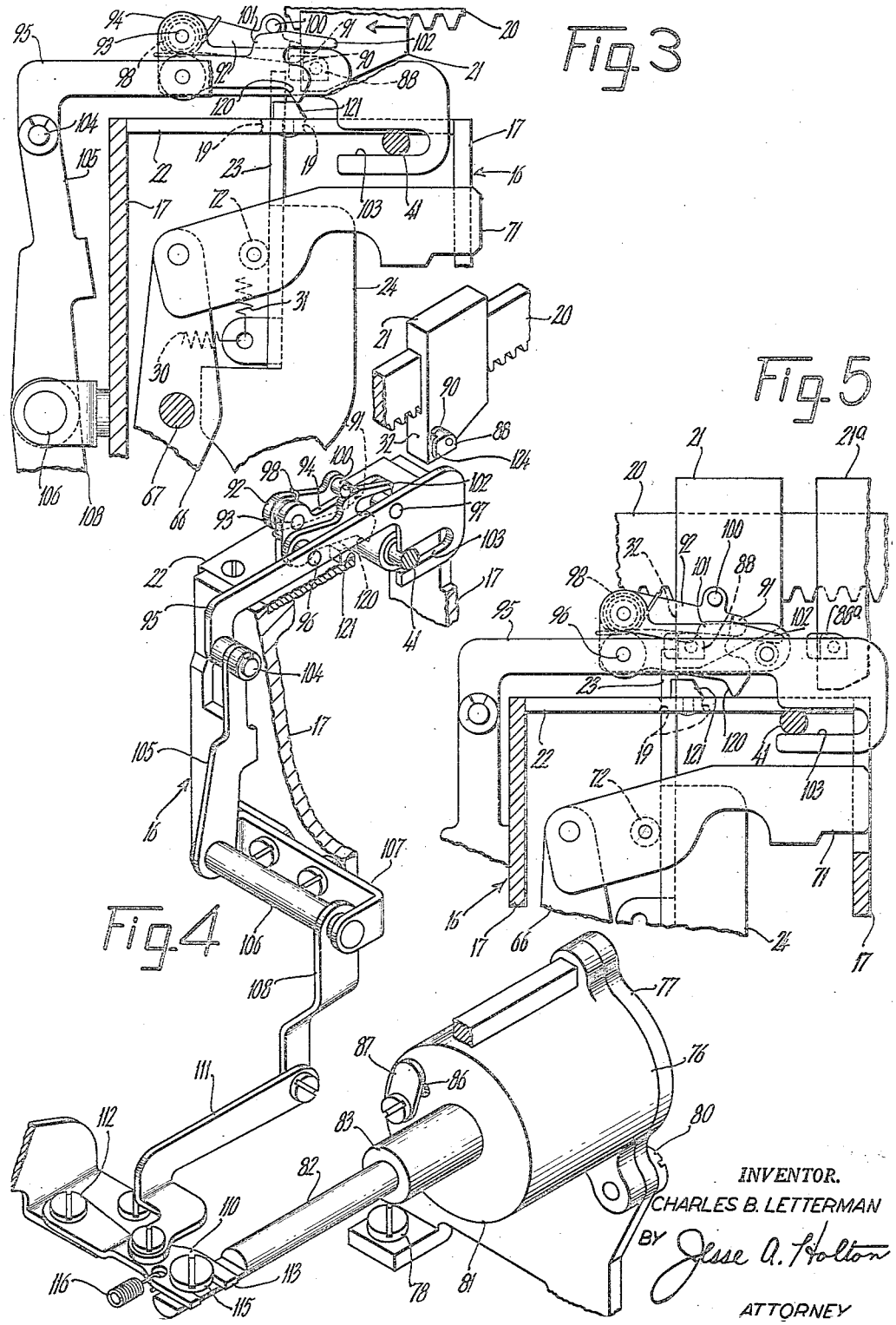

United States Patent Office 2,800,989
Patented July 30, 1957

2,800,989

CARRIAGE SHOCK ABSORBING DEVICE

Charles Benjamin Letterman, West Hartford, Conn., assignor to Underwood Corporation, New York, N. Y., a corporation of Delaware Application September 9, 1955, Serial No. 533,337

3 Claims. (Cl. 197—66)

This invention relates to business machines such as typewriters, which have a carriage required to be moved to the limit of stop means. It more particularly relates to provision in machines of the class stated for slowing the carriage in its approach to a stop position to a speed facilitating substantially its noiseless arrest. In the embodiment of the invention herein shown and described, the stated provision is in a form embracing an air displacement device for dash-pot.

It is generally an object of the invention to provide an efficient and simple device to slow down a carriage of a business machine, such as a typewriter, in its approach of a stopping position and just before reaching such position to free it again for unimpeded final movement to the accurate stopping position as defined by stop means.

It is an object adjunct to the foregoing object to provide an efficient carriage-slow-down device which after each slowdown action assumes immediately a state of readiness for renewed service in a further instituted carriage movement.

A further object of the invention is to provide for use with a power carriage return mechanism which shuts off automatically under automatic control of a return-position-defining margin stop, an efficiently operable device to slow down the movement of the carriage over a range in approach of the final return position and then to permit a final free movement, whereby the carriage return movement is always complete and said power return mechanism is always reliably shut off.

The power return mechanism herein featured is of the type which as an initial incident to its operation effects line spacing. Moreover, following each operation of said carriage return mechanism the carriage advances slightly in a conventional manner, moving said margin stop from a counterstop, the latter being part of a carriage return control mechanism. This gives room for said counterstop to be tripped to a carriage return instituting position from which it is displaceable by the return movement of the carriage by the said margin stop for return-shut-off action. If the carriage return mechanism is called into operation after the carriage has just been returned, then the return movement is equal to the stated slight advance of the carriage which follows each return, so that in effect there results only a line spacing operation.

In association with the mechanism just outlined, it is an important object of the invention also to provide a device for slowing down the carriage over a movement range which is closely in advance of said counterstop being engaged and moved by said margin stop, wherefore in line spacing operations said slow-down device will not function and resultingly the shut-off action incident to line spacing will be always lively and reliable.

A still further object of the invention is to provide a carriage slow-down device in a form preferably embracing a dash-pot which is self-restoring before the arrest of the carriage, the device, for that reason being immediately ready for a new slow-down effect in a further carriage movement.

Other objects and advantages of the invention will be apparent upon consideration of the detailed description which follows.

The invention is illustrated as embodied in an Underwood All Electric typewriter, and referring now to the drawings, Figure 1 is a fractional rear elevation showing a work sheet supporting carriage, a power return mechanism for said carriage and the novel carriage slow-down device embodying a dash-pot, all parts being in normally prevalent positions.

Figure 2 is a front perspective view of a line spacing device provided on the left end of the carriage.

Figure 3 is a fractional rear elevation of the carriage slow-down device actuated and ready to restore, the carriage traveling during a remainder of its return run without hindrance by the slow-down device.

Figure 4 is a rear perspective view of the carriage slowdown device and the operating mechanism, all parts being in normal positions.

Finally, Figure 5 is a rear elevation similar to Figure 3, the carriage having been returned to the full limit and the slow-down device having restored and allowed a final free movement.

Referring now more particularly to Figure 1, a work sheet supporting carriage 10 includes a usual grooved rail 11 guided in a stationary trackway structure 12 through the medium of usual anti-friction elements 13. The said carriage 10 includes, rising upwardly from said rail, two spaced ends 14 of which only the left-hand one is shown. Turnably supported in said carriage ends 14, and extending therebetween parallel to the rail 11 is a platen roll 15. The trackway structure is part of a machine framework which at the middle of the machine includes a relatively narrow mechanism housing 16 having opposite side walls 17. The housing 16 is flanked, substantially equally distant to each side thereof by main side walls 18, only the right-hand one of such walls being shown in Figure 1. A rack bar 20 fastened to the carriage ends 14 and generally coextensive with the carriage supports a carriage return limiting margin stop 21, the said stop having a releasable lock 29 meshing the rack of the bar 20, whereby to facilitate adjusting or setting it to different return-terminating positions along the rack bar 20. Projecting upwardly through a rectangular perforation 19 in a top plate 22 of the housing 16, see Figures 1 and 3, is a counterstop 23 by cooperation with which the margin stop 21 limits return runs of the carriage. The said counterstop 23 is part of an upright arm 24 which at its lower end has a slot 25 accommodating it upon a headed pin 26. The latter has support on a bracket 27 forming part of the machine framework. Springs 30 and 31, see Figures 1 and 3, have the combined effect to maintain the counterstop resiliently in an upward limit position defined by the lower end of the slot 25 and, as seen from the front of the machine, laterally to the right limit within the perforation 19 in said top plate 22. In the extreme return position of the carriage a face 32 of the margin stop crowds the counterstop 23 solidly against said right side of the perforation 19, that is the left side when viewed as in Figure 1.

In the illustrated embodiment of the invention, a power carriage return mechanism of usual structure is employed, and includes a drum 34 for winding a carriage return drawband 35 which leads over idler pulleys 36 and 37 to a line space mechanism actuating drum 38, see Figures 1 and 2. The drum 38 is turnably supported on a shaft 39 which is fast on the left one of the carriage ends 14. The stated idler pulley 36 is supported on a bracket 40 of the frame structure and the idler pulley 37 is carried on a stud 41 which is fast on a rear wall of the housing 16. The line space actuating drum 38 has unitary turnable therewith a pinion 42 which is in mesh with a gear sector 43 embodying a cam face 44. A roller 45 is borne on an arm 46 having pivotal support at 47 on the adjacent carriage end, and the said arm 46 carries concentrically with said roller 45 a line space pawl 48 for action on a usual line space ratchet wheel 50 which is fast on a shaft 51 having the platen roll 15 fast thereon to turn therewith. The said gear sector 43 with its cam face 44, under the tension of a spring 52, occupies normally the position seen in Figure 2. Pull on the drawband 35 actuates the sector 43 against a limit stop, not shown, and the line space pawl 48 thereby becomes actuated to advance the ratchet wheel 50 and thus to line space to the platen 15. The drawband operating drum 34 is normally under very light spring tension to turn in a direction to take up all slack in the drawband 35 but too weak to actuate the line space drum 38 from the normal position. To actuate the drawband 35 for line spacing and carriage returning operation the said drum 34 is adapted to be coupled to a shaft 53, which may be constantly driven by an electric motor 54 through speed reduction gearing indicated at 55. A slip clutch 56 is interposed between said motor 54 and said gearing 55 for permitting the carriage temporarily to be slowed down by the slow-down device without strain on the motor and the carriage return drive parts leading to the carriage. The drum 34 is connectable for operation by the shaft 53 through a normally open clutch having a driver member 57 fast on the shaft 53 and having another member 58 splined on a bushing 60 of the drum 34 for movement axially of the shaft 53 into engagement with the clutch member 57. The clutch member 58 is shiftable into engagement with the driver member 57 by a fork arm 61 reaching into an annual groove of the clutch member 58. The parts 34, 55, 57, 58 and 61 are all mounted on or contained in a housing 62 carried fast on the general framework of the machine. The fork 61 and an arm 63 are unitary with a shaft 64 which is pivotally mounted in the housing 62. A spring 65 associated with the arm 63 tends constantly to rock the structure 61, 63 to clutch engaging position, anti-clockwise with reference to Figure 1. However, in a usual manner, a lever 66, pivoted on a stud 67 in the housing 16, and having a link connection 70 with the arm 63, is normally held against clockwise, clutch closing movement from the Figure 1 position by a latch indicated at 68. Thereby the fork 61 is normally held in open-clutch position. Release of the latch 68 is effected by operation of a carriage return key, not shown, substantially as described in the patent to Sagner No. 2,541,295, dated February 13, 1951, or under carriage control, in a manner also well known. Upon release of said latch 68, the spring 65 effects a clutch closing movement of the fork 61, and through the link connection 70 a clockwise movement of the lever 66 in respect to the showing of Figure 1. From the upreaching end of the lever 66 there extends lengthwise of the carriage a link 71 which carries a pin 72. In the normal position of the lever 66 the pin 72 has the position seen in Figure 1, wherefore with reference to such figure the counterstop arm 24 is normally spring drawn to the leftward limit in the perforation 19. Responsive to the tripping of the latch 68, the lever 66 under the power of the spring 65 displaces the counterstop arm 24 rightwardly of Figure 1 within the perforation 19 to the position shown in Figure 3 and also closes the clutch. When now in a consequently instituted power return run of the carriage the face 32 of the margin stop 21 rides against the counterstop 23, it will restore the same to the normal position seen in Figure 1. Resultingly the pin 72 will be driven leftwardly of Figure 1 to restore the control lever 66 to the latch 68. This, of course, restores the fork 61 to open clutch position, wherefore the power return mechanism ceases to be active.

The carriage in its return movement is softly slowed down over a zone of travel in approach of and short of the limiting engagement of the stop 21 with the counterstop 23. The novel device for accomplishing this efficiently and advantageously will now be described. It includes a dash-pot piston 75 which normally has the position within a cylinder 76 as seen in Figure 1. A bracket plate 77, secured to the framework of the machine as at 78, furnishes one end of the said cylinder 76, the cylinder being secured to the bracket plate 77 by screws 80. Another end 81 of the cylinder may be integral therewith and a piston rod 82 reaches outwardly through a boss portion 83 of said end 81. The cylinder end afforded by the bracket 77 has a compression controlling port 84, the effective size of which is adapted to be varied by fastening a finger 85 in different-degree covering positions thereover. The end 81 has a vacuum controlling port 86, the effective size of which port is also variable by an adjustable finger 87.

The stated piston 75 is actuated from the cylinder end 81 toward the other cylinder end by the movement of the work sheet supporting carriage 10 in approach of but short of the return-limit position. To this end, the margin stop 21 is provided with a rearwardly projecting lug 88 having a face 90 to engage a rounded extremity 91 of a dog 92. The latter is pivotally carried at 93 on a plate 94 which is unitary with a slide 95 and extends parallel to said slide 95, the plate 94 being rigidly united with the slide 95 by spacing studs 96 and 97. The dog 92 has normally the pivotal position seen in Figure 1, wherein its rounded extremity 91 lies in the path of the margin stop lug 88, a torsion spring 98 urging the dog down for a pin 100 thereon to contact limitedly on an arm 101. The said arm 101 is pivotally carried on the spacing stud 96 and has a finger 102 resting normally on the spacing stud 97. The slide 95 is slotted at one end as at 103 for guidance on the same stud 41 which supports the guide roll 37 for the carriage drawband. The other end of the slide, as at 104, is linked to an arm 105 of a bail having a rock shaft 106 pivotally carried in a U-shaped bracket 107. The latter is secured to one of the housing walls 17. The said bail includes further a down-reaching arm 108 having connection with a horizontally swingable arm 110 through a link 111. The said arm 110 is pivoted upon the framework of the machine, as at 112, and at its swinging end has a fork 113 connecting it with a stud 115 on the piston rod 82. The described mechanism, under the tension of a spring 116 attached to the arm 110 is urged to occupy normally the position seen in Figures 1 and 4, wherein the upreaching arm 105 abuts limitedly against one of the housing walls 17.

Whenever the carriage is being returned, as by the described power return mechanism, or by manual effort, the face 90 on the margin stop lug 88 contacts the rounded extremity of the dog 92 about ½" before the marging stop 21 engages the counterstop 23, and carries then said dog, and therewith the slide 95, leftwardly of Figure 1. As the margin stop 21 approaches closely the counterstop 23, a cam nose 120 on the arm 101 is deflected upwardly by engagement with a cam lug 121 provided rigidly upon the housing top plate 22. Consequently the arm 101 is forced upwardly, carrying the dog 92 upwardly by action on the pin 100, see Figure 3. As the parts reach generally the positions illustrated in Figure 3, the rounded dog extremity 91 has such position relative to the lug face 90 that at further return movement the dog 92 will readily yield upwardly without being carried further along lengthwise of the carriage. Resultant to said dog 92 so yielding, the said spring 116 is enabled to move the slide 95 and the dog immediately to the position shown in Figure 5, wherefore the dash-pot piston restores immediately to the normal position, ready for new operative action.

While the slide 95 in the return movement of the carriage is carried along by the lug face 90, the piston 75 moves rightwardly as viewed in Figure 1. As will be explained in further detail, the restraint on the piston within the dash-pot controls the slide 95 to reduce the speed of return movement of the carriage softly and quickly to a very moderate speed. Meanwhile the motor 54 is permitted to run at constant speed, the carriage return mechanism being adapted to slow down momentarily in view of the provision of the slip clutch 56, whereby the carriage return mechanism including the drawband 35 is not subjected to undue strain. Immediately after the dog 92 slips above the lug 88, the carriage return mechanism is enabled to speed up again, causing the carriage to move at increasing speed, wherefore as the margin stop 21 rides against the counterstop 23, there ensues a reliably effected clutch-opening movement of the latter within the perforation 19 from the Figure 1 to the Figure 5 position. In such movement, the counterstop 23, acts on the link 71 through the pin 72 on the lever 66 for opening the clutch 58, 57. Furthermore, in a manner conventional, the latch 68 thereafter again holds the controlling lever 66 against clutch closing operation, pending the next operation of said latch.

Inasmuch as the carriage return drive is enabled to exert substantially its full force on the carriage for movement of the counterstop 23 by the margin stop 21, it follows that the operation of the control lever 66 to open clutch position is effected with vigor and reliability. Obviously, also, because the carriage is slowed to a very moderate speed immediately before the margin stop 21 engages the counterstop 23, the carriage will still move very slowly and will have relatively little momentum when it reaches the limit of its return run. Undue or objectionable shock and noise is thus avoided without impairing the reliability of the shut-off action or accurate return termination.

During the actuation of the slide 95 the piston 75 moves from the position seen in Figure 1 rightwardly in the cylinder 76. In such movement, a vacuum condition builds up rapidly at the side of the piston facing the cylinder end 81 while pressure builds up within the cylinder at the piston side facing the plate 77. The measures of vacuum condition and pressure condition are controllable respectively by adjustment of the fingers 87 and 85 for the ports 86 and 84. Thus by appropriate adjustment of said ports 86 and 84, the most suitable slow-down action or characteristic of the dash-pot on the carriage can be obtained. Quick return of the slide 95 and the dog 92 is facilitated by a provision of a flap valve 122 associated with a passage 123 in the piston 75, such flap valve 122 opening automatically during the return stroke of the piston due to a pressure build-up on the piston side facing the cylinder end 81.

The lug 88 has preferably an ear 124 extending beyond the face 90 and coming to lie behind the rounded dog extremity 91, thereby to prevent such dog extremity from accidentally slipping rearwardly off the lug face 90.

After the return motion of the carriage is terminated, the carriage advances slightly in letter feed direction in a conventional manner, under urge of a spring motor as controlled by a letter feed escapement.

In the position so reached, by a releasing operation of the latch 68, the carriage return drive is adapted to be called into action to effect an operation of the line spacing mechanism 38, 43, 45, 48. Incident to the drive being so rendered active, the counterstop 23 moves to the position seen in Figure 3. Moreover, the dog 92 at such time overlies idly the lug 88 substantially as in Figure 5, wherefore during a slight possible return movement of the carriage which follows the operation of the line spacing device, the dash-pot is completely out of action. This allows the clutch opening action of the margin stop 21 upon the counterstop 23 and leading to the control lever 66 to be unimpeded by the dash-pot, and therefore to be vigorous, certain and reliable.

In Figures 1 and 5 there is shown a second return terminating margin stop 21a which reaches lower than the marging stop 21. Return runs are terminated under control of this margin stop 21a if the counterstop 23 in accompaniment to a clutch closing movement of the control lever 66, in a known manner, is given a position just below the level of the lower tip of the margin stop 21. In a so instituted carriage return, the carriage will be temporarily slowed down as the lug 88 on the marging stop 21 encounters the dog 92 and thus comes under the speed reducing influence of the dash-pot. In a moment thereafter the dog 92 becomes automatically divorced from the lug 88 and the carriage resumes its full returning speed while the marging stop 21 passes over and beyond the counterstop 23. During the resumed full-speed return movement, a lug 88a on the margin stop 21a meets the dog 92, actuating it and the slide 95 in the same manner as explained in connection with the margin stop 21, the speed of the carriage therefore becoming rapidly reduced. Just before the margin stop 21a encounters the counterstop 23, the dog 92 becomes deflected out of operative alignment with the lug 88a, and thus allows restoration of the dash-pot and vigorous completion of the carriage return run unhindered by the dash-pot.

In the event the carriage is first returned to the limit of the margin stop 21, it may then be further returned to the limit of the margin stop 21a with an accompanying cushioning action and resumption of full returning power. This will be appreciated from Figure 5, wherein the carriage has moved to the return limit determined by the margin stop 21. Following the return shut-off action by the margin stop 21, the return drive is again rendered active accompanied by a lowering movement of the counterstop 23. Then in a first part of such instituted return run, the dog 92, permitted by the lug 88, is swung by the spring 98 into cooperative alignment with the lug 88a on the margin stop 21a. Therefore the lug 88a also in such case will pick up the dog 92 to effect a dash-pot operation of the slide 95, resulting in a desired, temporary slow-down of the carriage, there being a pick-up of speed during a last part of return movement when the dog 92 under control of the cam lug 121 frees the carriage from dash-pot influence.

While the automatically restoring slow-down device of the invention is especially advantageous in machines embodying power return mechanisms, its beneficial use for slowing manually moved carriages over a zone terminating short of a carriage arresting position is self-evident. It will also be seen that the mechanism is readily adaptable for use in controlling carriage tabulating movements so that there will be no undue arresting shock but yet a free final motion. In other words, while only one embodiment of the invention has been shown and described, many variations may be resorted to within the scope of the invention, and portions of improvements may be used without others.

What is claimed is:

1. The combination in a machine of the class described having a carriage movable oppositely in advance and return directions on a frame, of a stop on the frame, a stop on the carriage affording normally in cooperation with said first stop a carriage return limit, and a device for slowing down the carriage while it is returning through a zone in approach of but short of the carriage return limit afforded by said stops, comprising, a frame-supported fluid-displacement element, a member supported for travel with the carriage, a second member normally in alignment with said first member for operation thereby in the return of the carriage through said zone and having connection with said fluid-displacement element, whereby the carriage is slowed down while it returns through said zone, said second member and said fluid-displacement element biased to restore, means supporting one of said members for movement transversely of the carriage out of operative alignment with the other member, spring means constantly urging the transversely movable member into operative alignment with the other member, means including a face on the frame engageable by a face which has connection with the transversely movable member, to force the latter member against the urge of said spring means out of operative alignment with the other member as the carriage returns through a terminal portion of said zone, the carriage consequently concluding its return free of influence by the fluid-displacement element, said frame-supported stop controllable to facilitate movement of the carriage in return direction beyond the normally afforded return limit, and means on said members adapted for cooperation to cam the transversely movable member automatically out of alignment with the other member if the carriage is advanced from a position in which the member on the margin stop stands moved in return direction beyond the other member.

2. The combination in a machine of the class described having a carriage movable oppositely in advance and return directions on a frame, of a stop on the frame, a carriage return margin stop on the carriage engageable with said first stop to terminate return runs of the carriage, and a device for slowing down the carriage while it is returning through a zone in approach of but short of the carriage return limit afforded by said stops, comprising a return impeding element, a lug on said margin stop, a member normally in operative alignment with said lug for operation thereby in the return of the carriage through said zone and having connection with said return impeding element to operate it, whereby the carriage is slowed down while it is being returned through said zone, means supporting said member for movement transversely of the carriage out of operative alignment with said lug, spring means to urge said member in the advance direction of the carriage and also transversely of such direction into operative alignment with said lug, cam means including a face on the frame engageable by a part which is moved along with the member as the latter is operated by the lug, to force said member out of operative alignment with the lug as the carriage returns through a terminal portion of said zone, the carriage consequently concluding its return movement free of any slowing influence by said return impeding element, said frame-supported stop controllable to facilitate movement of the carriage in return direction beyond the normally afforded return limit, placing thereby said lug in carriage return direction beyond said member, and faces on said member and said lug adapted for cooperation to cam said member transversely of the carriage as the carriage is advanced to a position in advance of the return limit.

3. The combination in a machine of the class described having a carriage movable oppositely in advance and return directions on a frame, of a stop on the frame, a carriage return margin stop on the carriage adjustable thereon parallel thereto and engageable readily with said first stop to terminate carriage return runs of the carriage, and a device for slowing down the carriage while it is returning through a zone in approach of but short of the carriage return termination afforded by said stops, comprising, a movement impeding means, a lug on said margin stop, a slide on the frame operatively connected with said movement impeding means, a dog, pivot means mounting said dog swingably on said slide for movement transversely of the carriage from a position of operative alignment with said lug, said lug by the return of the carriage through said zone operating said dog and thereby operating said slide and movement impeding means, whereby the carriage is slowed down in its return through said zone, spring means biasing said dog and slide in carriage advance direction and also the dog into operative alignment with said lug, a cam face on the frame and an arm pivotally carried on said slide for movement therewith and having a cam face thereon for cooperation with the frame supported cam face during carriage returns at the terminal portion of said zone, thereby to force said arm transversely of the carriage and in turn to force said dog out of operative alignment with the lug, the carriage consequently concluding its return movement free of any slowing influence by said movement impeding means.

References Cited in the file of this patent

UNITED STATES PATENTS

| | | |
|---|---|---|
| 2,283,565 | Michelsen | May 19, 1942 |
| 2,379,843 | Von Reppert | July 3, 1945 |